J. BEAUCHAMP.
MOTOR CYCLE GRIP ATTACHMENT.
APPLICATION FILED MAY 16, 1913.
1,185,467.
Patented May 30, 1916.
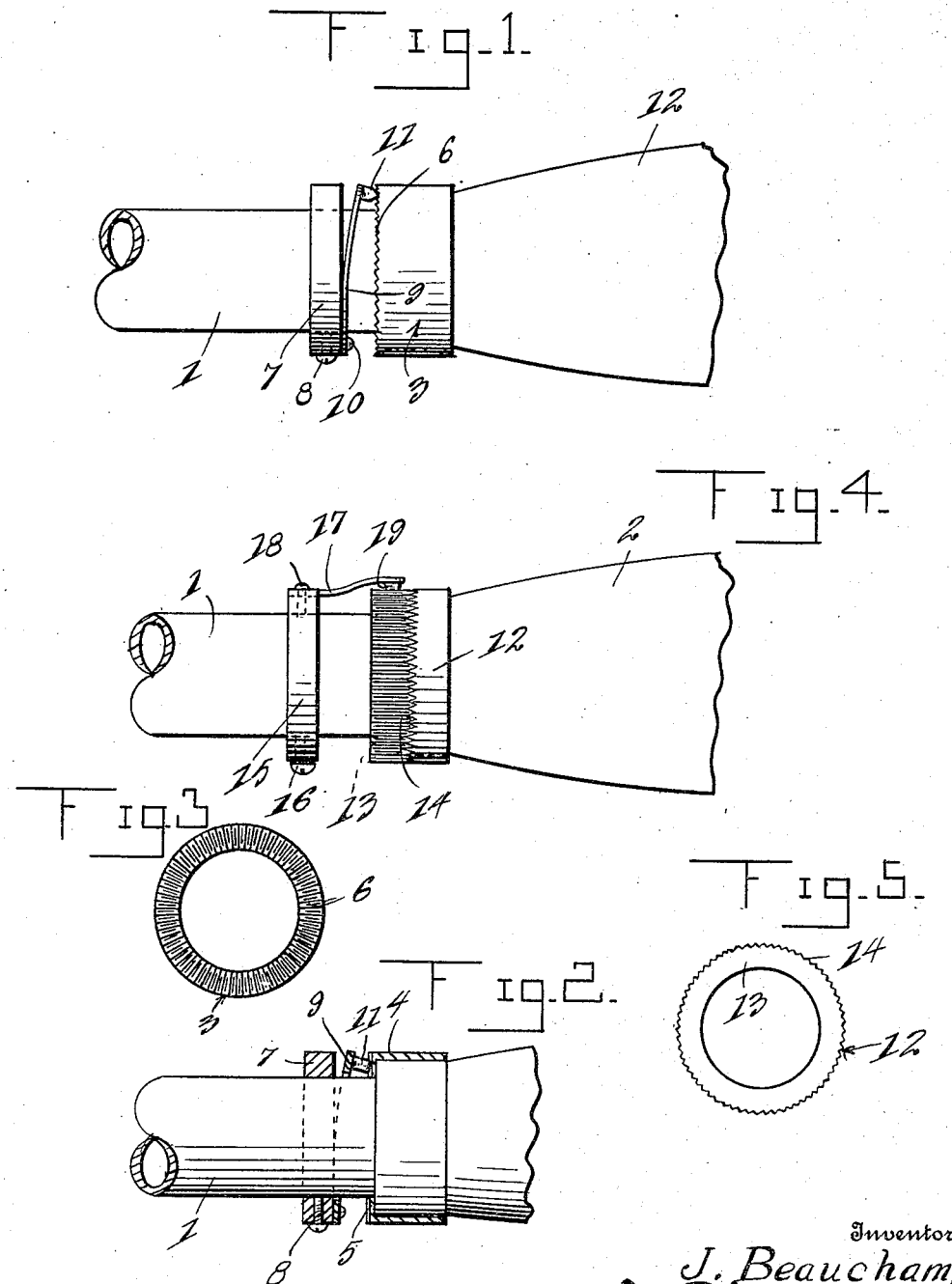

UNITED STATES PATENT OFFICE.

JOSEPH BEAUCHAMP, OF NEWPORT, RHODE ISLAND.

MOTOR-CYCLE-GRIP ATTACHMENT.

1,185,467.  Specification of Letters Patent.  Patented May 30, 1916.

Application filed May 16, 1913. Serial No. 768,083.

*To all whom it may concern:*

Be it known that I, JOSEPH BEAUCHAMP, a citizen of the United States, residing at Newport, in the county of Newport and State of Rhode Island, have invented certain new and useful Improvements in Motor-Cycle-Grip Attachments; and I do hereby declare the following to be a full, clear, and exact description of the invention, such as will enable others skilled in the art to which it appertains to make and use the same.

This invention relates to new and useful improvements in attachments for motor-cycle grips, and has for its object to provide a means by which the grip of a motorcycle may be retained in the desired position by the operator.

It has been the practice for some time in the manufacturing of motorcycles to provide grips which are rotatable upon the handle bars, these grips being connected in such a way that when turned they will control either the ignition or the flow of gas to the cylinder of the engine on the motorcycle to which the grips are attached. In the use of my invention the grips are preferably provided at their forward extremity with serrated collars which are adapted to co-act with a spring tongue having a depending lug attached thereto, which is adapted to enter the serrations in the collars and prevent the same from being accidentally rotated.

With the above and other objects in view, I will now proceed to describe my invention in the following specification and accompanying drawings, in which, Figure 1 is a view of my improved attachment as it would appear when applied to the grip of a motorcycle; Fig. 2 is a view of Fig. 1, showing it partly in section; Fig. 3 is a view of the collar which is attached to the grip; Fig. 4 is a view in elevation of another form of my grip attachment; and Fig. 5 is an end view of the collar used in the form shown in Fig. 4.

Referring to the drawings by characters of reference, 1 indicates the usual handle bar of a motorcycle having rotatably mounted thereon the grip 2, this grip 2 being of rubber or any suitable material and secured to the handle bar 1 in the usual manner.

In placing the usual collar around the forward end of the grip I preferably provide the collar 3 which comprises the body portion 4 having an internal annular flange 5 formed at one extremity thereof. Serrations indicated at 6 are formed on the flange 5, as clearly illustrated in Fig. 2, the use of which will be more fully hereinafter described. The collar 3 may be secured to the grip in any suitable manner to insure its rotation therewith.

A set collar 7 is provided at any desired point with the set screw 8, which extends therethrough and is adapted to frictionally engage the handle bar 1 and hold the collar against rotation thereon. A spring 9, which is preferably circular in form, is secured to the collar 7 by means of the screws 10, the side of the spring opposite the screws being bent outwardly so that when the device is in place the spring will assume the position indicated in Fig. 1. A suitable lug 11 is secured to the spring at a point diametrically opposite the point at which it is secured to the collar and is preferably beveled to form a tooth, which enters the serrations on the collar 3 carried by the grip. This lug 11, clearly shown in Fig. 1, extends at substantially right angles to the face of the spring.

In the form indicated in Figs. 4 and 5 the usual handle bar and grip are provided. The grip has secured to its forward end a collar 12, comprising the usual body portion and the inturned flange 13. A series of serrations, indicated at 14, is provided around the periphery of the collar, the use of which will appear as the description proceeds. This collar 12 may be secured to the grip as previously described. A collar 15 is provided with the set screw 16, and has a recess in its periphery diametrically opposite the set screw. A suitable leaf spring 17 is seated in the recess and held therein by means of the screw 18. Thus it will be seen that a substantially smooth joint will be formed where the spring is secured to the collar. This spring 17 is bent, as clearly illustrated in Fig. 4, and provided at its outer extremity with a downwardly projecting lug 19, which is tapered to form a tooth adapted to enter the serrations in the collar 12 and to prevent the same from being accidentally rotated.

It will be obvious that when my device is applied to the handle bars of a motorcycle that said handle bars will be prevented from accidental rotating and it will be possible for the operator to adjust the machine to any desired speed, and that speed will be maintained until the operator desires to reset the machine to any speed. In the old type of machine considerable difficulty has been experienced because of the rotating of the handle bars, which cause the speed of the machine to increase or decrease, whereas with my improved invention such action is substantially eliminated.

While in the foregoing I have shown and described the preferred embodiment of my invention, I wish it to be understood that I may change the specific arrangements of parts without in any way departing from the spirit and scope of my invention.

Having thus fully described my invention, what I claim is:

In combination with a motorcycle having rotatable grips, a relatively large collar secured on the forward end of the grip, a plurality of teeth formed on the forward end of the collar around the periphery thereof, said teeth extending inwardly toward the rear end of the collar for approximately one-half the distance thereof, a second collar removably secured to the handle bar and having a recess on its outer face, a flat leaf spring having one end seated in said recess and means extending through said spring and into said collar for holding the spring rigid therein, the free end of said spring directed toward the tooth portion of the first named collar, a downwardly projecting lug formed on the under side of the free end of said spring, said lug being tapered to form a tooth adapted to engage the teeth of the first named collar preventing the same from being accidentally rotated.

In testimony whereof I affix my signature in presence of two witnesses.

JOSEPH BEAUCHAMP.

Witnesses:
 H. F. WEAVER,
 P. C. EVANS.

Copies of this patent may be obtained for five cents each, by addressing the "Commissioner of Patents, Washington, D. C."